No. 810,368. PATENTED JAN. 16, 1906.
W. E. CAWOOD.
EYEGLASSES.
APPLICATION FILED JAN. 30, 1905.
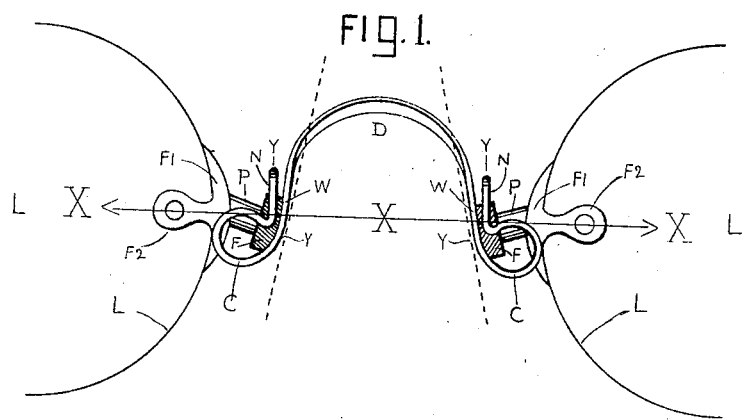
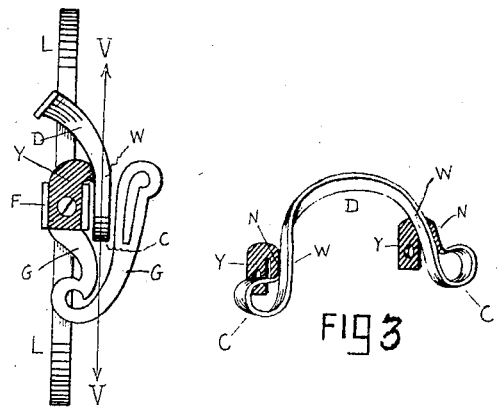

UNITED STATES PATENT OFFICE.

WALTER E. CAWOOD, OF TOLEDO, OHIO.

EYEGLASSES.

No. 810,368.

Specification of Letters Patent.

Patented Jan. 16, 1906.

Application filed January 30, 1905. Serial No. 243,325.

*To all whom it may concern:*

Be it known that I, WALTER E. CAWOOD, a citizen of the United States, residing at Toledo, in the county of Lucas and State of Ohio, have invented certain new and useful Improvements in Eyeglasses; and I do hereby declare the following to be a full, clear, and exact description of the invention, such as will enable others skilled in the art to which it appertains to make and use the same.

This invention relates to eyeglasses, and comprises the combination of a pair of lenses, lens-posts with flanges, a pair of nose-guards, and an intermediate bridge-spring.

The object of my present invention is to materially improve the construction of eyeglasses by constructing a mounting that will conform to the anatomical lines of the nose and overcome the annoying feature of axial deviation of the lenses consequent to the seating of the structure upon the nose of the wearer, it being understood that former inventions comprising this class of construction the intermediate bridge-spring requires horizontal flexation in order to seat the glasses upon the nose of the wearer. It may therefore be seen that any excessive horizontal flexation consequent to use would have a tendency to bow or force the lenses outward from their proper axial alinement, and thereby impair the refractive qualification of the lenses. This annoying feature is overcome by the application of my invention by reason that the convolutions or flexation coils of my nose-piece are adapted to flex in the vertical plane, which permits the glasses to be spread apart longitudinally when inserted upon the nose by the wearer. It may also be understood that my glasses when seated upon the nose would not be apt to force the lenses upward and outward by reason that in my construction I make a lens-post that is inclined downward from the lens-clamps and the horizontal axis of the lenses. It may therefore be understood that by this arrangement the post-flanges, which are disposed at right angles to the end of the post fitting next to the cuticle of the nose, would be inclined at an angle that would conform to the usual inclination of the nose, and would thereby overcome the objectionable feature of the lower portion of the flanges cutting the cuticle or forcing the lenses upward or outward from their proper axial alinement, which it would be apt to do if the conventional horizontally-disposed lens-post were used, the feature of novelty and adjustment being hereinafter described, the specification and drawings forming a part thereof.

Figure 1 of the accompanying drawings illustrates the rear elevation of my present invention, drawn to an enlarged scale, of four to one, the dotted lines representing the usual inclination of the nose, the horizontal axis indicated by line X. Fig. 2 shows a view in end elevation, enlarged scale, illustrating the combination of lens, post-flanges, nose-guard, and bridge-spring, the vertical plane indicated by line V. Fig. 3 shows enlarged view of the bridge-spring drawn in perspective elevation.

Similar letters of reference designate corresponding parts.

In my present invention D indicates the intermediate dome of the bridge-spring; W, the inclined walls or plates of the same; C, the convolution or flexation coil; N, the neck, which forms a direct continuation with convolution C; Y, the yoke that enters intermediate of the flanges; P, the inclined lens-post; F, the inclined lens-post flanges; F', flanges that abut the edge of the lens; $F^2$, flanges that clamp the face of the lens; L, the lenses; S, the post-screw; G, the nose-guard.

My present invention comprises the combination of the elements herein specified and depicted. These coördinate parts can be constructed of any desirable metal, preference, however, being given to solid gold, for the reason that my invention obviates the necessity of using bearing-pads. The metal of this structure forming a direct contact with the cuticle of the nose would not be apt to corrode or rust if solid gold were used, it being understood that dome D and its inclined walls or plates W rest directly upon the cuticle, thereby resisting tipping or pivotal action of the glasses. The convolution C gently presses the plates W and yoke-plate Y against the side of the nose, which materially aids the nose-guards in anchoring the structure upon the nose of the wearer. Yoke-plate Y unites the bridge-spring to post-flanges F and is conjoined to convolution C by neck N, which extends over the top of flanges F rearward, thence downward parallel with the sides of said flanges. By this arrangement convolution C enters the intermediate channel of the nose-guard, thereby permitting the main bearing-arm of the guard to have a free lateral movement, it being understood that when the glasses are inserted upon the nose the guard follows a direction practically vertical or in the same vertical plane that plates W and convolution C do when pressure is brought to bear upon the lenses. The nose-guard herein depicted is known to the trade as the "Cawood" guard. The specification and claims for the same are set forth in detail in the patent to W. E. Cawood, Serial No. 734,667, patented July 28, 1903. The feature of adjustment may be fully understood by those skilled in the art of fitting. My present invention can be adjusted to the different pupillary distance by the expansion of convolution C. The dome D and its plates W may be adjusted to any desirable inclination and angle without the manipulation of the pliers, which would have a tendency to mar the surface of the metal.

Having described my invention, what I claim as new therein, and desire to secure by Letters Patent, is—

In eyeglasses, the combination of a pair of lenses, a pair of lens-holders comprising flanges F' and F², lens-posts inclined downwardly from flanges F', side flanges F united at right angle to the inclined lens-posts, a nose-guard and a flexible metallic bridge-spring united intermediate of the post-flanges the bridge-spring comprising sectional portions consisting of an arch or dome D having extended portions or plates W said plates located beyond the post-flanges and parallel thereto, vertical convoluted portions C forming a direct continuation of plates W said convolutions looped in the vertical plane whereby the glasses may be spread apart longitudinally when applied to the nose of the wearer, the aforesaid bridge-spring united to the post-flanges by a yoke-plate and neck said yoke-plate seated intermediate of the post-flanges in the vertical plane the neck portion extending over the top of the post-flanges thence downward parallel with the flange and cojoining the aforesaid vertical convolution of the bridge-spring, the said metallic convolution adapted to enter the intermediate channel of the nose-guard substantially as and for the purpose specified.

In testimony whereof I hereunto affix my signature in presence of two witnesses.

WALTER E. CAWOOD.

Witnesses:
CARL H. KELLER,
JOHN SWIGART.